United States Patent
Kanter et al.

(10) Patent No.: US 9,380,128 B2
(45) Date of Patent: Jun. 28, 2016

(54) COMBINING USER PROFILE INFORMATION MAINTAINED BY VARIOUS SOCIAL NETWORKING SYSTEMS

(71) Applicant: Facebook, Inc., Menlo Park, CA (US)

(72) Inventors: Jeffrey Andrew Kanter, San Francisco, CA (US); Benjamin Peter Davenport, Palo Alto, CA (US); Adrien Thomas Friggeri, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/137,959

(22) Filed: Dec. 20, 2013

(65) Prior Publication Data

US 2015/0180913 A1     Jun. 25, 2015

(51) Int. Cl.

| G06F 15/16 | (2006.01) |
|---|---|
| H04L 29/08 | (2006.01) |
| G06Q 30/02 | (2012.01) |
| G06Q 50/00 | (2012.01) |
| H04W 4/20 | (2009.01) |

(52) U.S. Cl.
CPC .......... *H04L 67/306* (2013.01); *G06Q 30/0269* (2013.01); *G06Q 50/01* (2013.01); *H04W 4/206* (2013.01)

(58) Field of Classification Search
CPC .......... G06Q 30/0269; G06Q 30/0241; G06Q 30/0631; G06F 17/30702; H04L 67/306; H04L 63/102; H04L 67/30
See application file for complete search history.

(56) References Cited

U.S. PATENT DOCUMENTS

| 8,364,708 B1 * | 1/2013 | Braytenbaum ... G06F 17/30699 705/319 |
| 8,706,739 B1 * | 4/2014 | Song ....................... G06F 17/30 707/748 |
| 2008/0249987 A1 | 10/2008 | Ogasawara |
| 2010/0287050 A1 * | 11/2010 | Jones ...................... G06Q 30/02 705/14.58 |
| 2011/0179125 A1 | 7/2011 | Lee et al. |
| 2012/0227086 A1 * | 9/2012 | Dale ....................... G06Q 50/01 726/3 |
| 2012/0324550 A1 * | 12/2012 | Wasilewski ............. G06F 21/10 726/5 |
| 2013/0097233 A1 * | 4/2013 | Raman ................... G06Q 50/01 709/204 |
| 2013/0110583 A1 * | 5/2013 | Ormont et al. ................ 705/7.29 |
| 2013/0110641 A1 * | 5/2013 | Ormont ................... G06Q 50/01 705/14.66 |
| 2013/0166609 A1 | 6/2013 | Hao et al. |
| 2013/0298030 A1 | 11/2013 | Nahumi et al. |
| 2014/0032659 A1 * | 1/2014 | Marini .................... H04L 51/32 709/204 |
| 2014/0344057 A1 * | 11/2014 | Massoudi .......... G06Q 30/0251 705/14.58 |

OTHER PUBLICATIONS

PCT International Search Report and Opinion, PCT Application No. PCT/US2014/068303, Mar. 24, 2015, fifteen pages.

* cited by examiner

*Primary Examiner* — Brian J Gillis
*Assistant Examiner* — Kamran Mohammadi
(74) *Attorney, Agent, or Firm* — Fenwick & West LLP

(57) ABSTRACT

A social networking system generates an augmented user profile for a user. The augmented user profile includes information from user profiles maintained by additional social networking systems that correspond to the user of the social networking system. For example, user profiles maintained by additional social networking systems having a threshold similarity to a user profile maintained by the social networking system are identified, and characteristics of the user in the identified user profiles are included in the augmented user profile along with characteristics from the user profile maintained by the social networking system. Characteristics of the user from the augmented user profile are used to identify content, such as advertisements, for presentation to the user.

18 Claims, 2 Drawing Sheets

COMBINING USER PROFILE INFORMATION MAINTAINED BY VARIOUS SOCIAL NETWORKING SYSTEMS

BACKGROUND

This disclosure relates generally to social networking systems, and more specifically to combining information in user profiles maintained by various social networking systems.

A social networking system allows its users to connect to and communicate with other social networking system users. Users may create profiles on a social networking system that are tied to their identities and include information about the users, such as interests and demographic information, and share this information with other social networking system users by posting content on the social networking system or otherwise allowing other users to access this information. The users may be individuals or entities such as corporations or charities. Because of the increasing popularity of social networking systems and the increasing amount of user-specific information maintained by social networking systems, a social networking system provides an ideal forum for advertisers to increase awareness about products or services by presenting advertisements to social networking system users. The increasing amount of user-specific information maintained by social networking systems also allows advertisers to gather information about users' characteristics to more effectively target advertisements to social networking system users, subject to privacy settings of social networking system users.

Users of a social networking system often post content to the social networking system for presentation to other social networking system users, allowing the other users to interact with the posted content. Based on interactions by a user with content posted other users, the social networking system may determine characteristics of the user, such as the user's interest in other users or types of content. The social networking system may use characteristics of a user to select content, such as advertisements, for the user to increase the likelihood of interacting with content that the social networking system presents to the user.

Conventionally, a social networking system presents content to a user based on information associated with the user by social networking system. For example, the social networking system selects content for presentation to a user based on demographic information in a user profile associated with the user, actions performed by the user and captured by the social networking system, connections between the user and other users of the social networking system, or other suitable information. However, users of a social networking system are often users of additional social networking systems and provide different or additional demographic information or perform different actions when interacting with an additional social networking system. Hence, information associated with a user by a single social networking system may incompletely reflect characteristics of the user.

SUMMARY

A social networking system generates an augmented user profile for a user that includes information associated with the user by additional social networking systems. For example, the augmented user profile includes information from the user profile for the user maintained by the social networking system and information from additional user profiles associated with the user by additional social networking systems. Information in the augmented user profile is used by the social networking system to select content for presentation to the user, allowing the social networking system to account for information about the user maintained by additional social networking systems to provide content better tailored to the user.

To generate the augmented user profile, the social networking system retrieves a user profile associated with the user and retrieves additional user profiles maintained by additional social networking systems. Characteristics of the user from the user profile are compared to characteristics of the user from each of the additional user profiles to generate similarities between the user profile and the additional user profiles. For example, a score describing the similarity between a user profile and an additional user profile is generated based on the characteristics in the user profile that match characteristics in the additional user profile. The similarity between the user profile and an additional user profile may be affected by the types of characteristics in a user profile matching those in an additional user profile as well as whether characteristics in the user profile and in the additional user profile fully or partially match. Additional user profiles with at least a threshold similarity to the user profile are selected, and characteristics in the selected additional user profile are combined with characteristics in the user profile to generate the augmented user profile. Additionally, information associated with the additional user profiles, such as content or actions associated with an additional user profile by an additional social networking system, may be included in the augmented user profile.

Using information in the augmented user profile, the social networking system selects content for presentation to the user. For example, characteristics of the user in the additional user profile are compared to targeting criteria associated with advertisements to identify advertisements eligible for presentation to the user. As another example, objects maintained by the social networking system with which the user has a threshold likelihood of interacting are identified based on characteristics of the user from the augmented user profile and identified to the user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
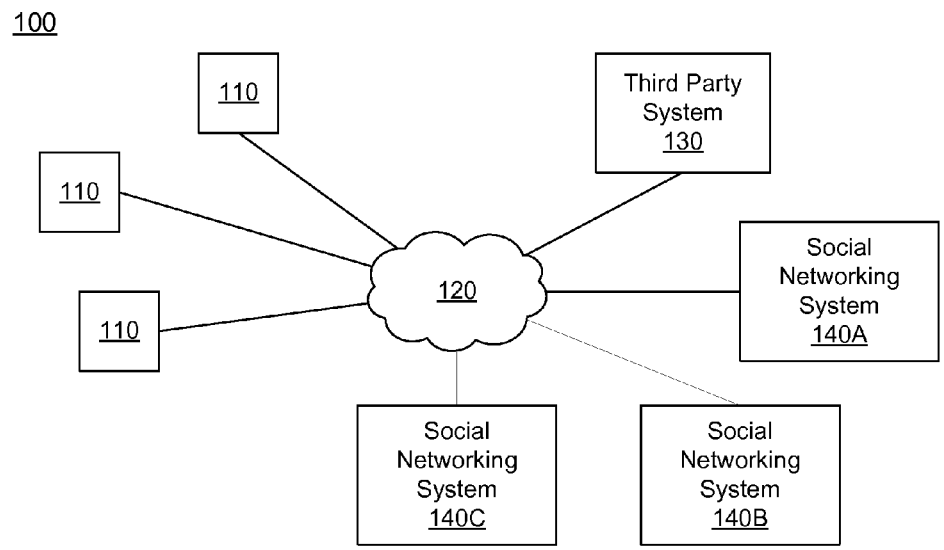
FIG. 1 is a block diagram of a system environment in which multiple social networking systems operate, in accordance with an embodiment.

FIG. 1 is a block diagram of a system environment 100 including multiple social networking systems 140. The system environment 100 shown by FIG. 1 comprises one or more client devices 110, a network 120, one or more third-party systems 130, and one or more social networking systems 140A, 140B, 140C (also referred to herein individually and collectively using reference number 140). In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a Smartphone or another suitable device. A client device 110 is configured to communicate via the network 120. In one embodiment, a client device 110 executes an application allowing a user of the client device 110 to interact with one or more social networking systems 140A, 140B, 140C. For example, a client device 110 executes a browser application to enable interaction between the client device 110 and a social networking system 140 via the network 120. In another embodiment, a client device 110 interacts with a social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with one or more social networking systems 140A, 140B, 140C, which are further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to a social networking system 140, such as advertisements, content, or information about an application provided by the third party system 130.

One or more social networking systems 140A, 140B, 140C are coupled to the network 120 and communicate with the client device 110. While FIG. 1 shows three social networking systems 140A, 140B, 140C, in other embodiments, any number of social networking systems 140 may be included in the system environment 100. As further described below in conjunction with FIG. 2, a social networking system 140 maintains a user profile for each of its users and allows users to establish connections with other users. Users of a social networking system 140 provide content to the social networking system 140, which presents the provided content to other users based on connections between users and/or information in user profiles. Using interactions between a user and content presented to the user, connections between the user and other users, as well as information in a user profile associated with the user, a social networking system 140 selects content for presentation to the user. A user of a social networking system 140A may also have user profiles maintained by additional social networking systems 140B, 140C, with user profiles maintained by different social networking systems 140A, 140B, 140C including different characteristics.

Figure 2:
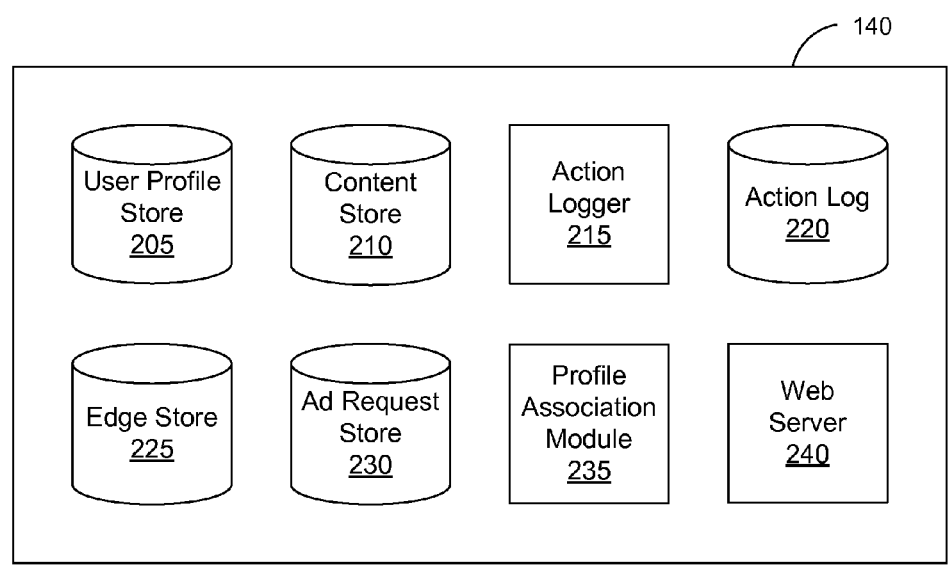
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, an ad request store 230, a profile association module 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

A user profile may include one or more direct characteristics that uniquely identify a user associated with the user profile. Examples of direct characteristics include an e-mail address or a phone number. Additionally, a connection between a user profile and a user profile maintained by an additional social networking system 140 may be stored in the user profile and is a direct characteristic. For example, a social networking system 140A may leverage connections between users maintained by an additional social networking system 140B by sharing login credentials between the social networking system 140A and the additional social networking system 140B. This sharing of login credentials establishes a connection between a user profile associated with the user maintained by the social networking system 140A and a user profile associated with the user by the additional social networking system 140B. A connection between a user profile maintained by a social networking system 140A and an additional user profile maintained by an additional social networking system 140B indicates that the user profile and the additional user profile are associated with the same user.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's interest for an object, interest, or other user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An advertisement request includes advertisement content and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the social networking system 140 if the advertisement is presented to a user, if the advertisement receives a user interaction, or based on any other suitable condition. For example, the bid amount specifies a monetary amount that the social networking system 140 receives from the advertiser if the advertisement is displayed and the expected value is determined by multiplying the bid amount by a probability of the advertisement being accessed.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the social networking system 140. Targeting criteria may also specify interactions between a user and objects performed external to the social networking system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

The profile association module 235 retrieves a user profile from the user profile store 205 and accesses one or more additional social networking systems 140B, 140C to identify additional user profiles maintained by the additional social networking systems 140B, 140C associated with the user profile from the user profile store 205. For example, the profile association module 235 retrieves a user profile associated with a user from the user profile store 205, and accesses additional user profiles maintained by additional social networking systems 140B, 140C that are associated with users of at least one of the additional social networking systems 140B, 140C. The profile association module 235 compares characteristics in the user profile from the user profile store 205 to characteristics in additional user profiles maintained by the additional social networking systems 140B, 140C. Based on characteristics in the user profile from the user profile store 205 matching at least a portion of characteristics in an additional user profile maintained by an additional social networking system 140B, 140C, the profile association module 235 determines a similarity between the user profile from the user profile store 205 and each of the additional user profiles, as further described below in conjunction with FIG. 3.

If the user profile from the user profile store 205 has at least a threshold similarity with an additional user profile maintained by an additional social networking system 140B, 140C, an augmented user profile including characteristics from the additional user profile from the additional social networking system 140B, 140C and characteristics from the user profile from the user profile store 205 is generated and stored in the user profile store 205. Hence, an augmented user profile includes characteristics associated with a user by a social networking system 140A, as well as characteristics associated with the user by one or more additional social networking systems 140B, 140C. An augmented user profile may be associated with a corresponding user profile maintained by the social networking system 140. As further described below in conjunction with FIG. 3, content may be selected for presentation to a user based on characteristics associated with the user by an augmented user profile for the user. This allows content selection to account for characteristics associated with the user by additional social networking systems 140 to increase the likelihood of the user having an interest in content selected by a social networking system 140.

The web server 240 links the social networking system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the social networking system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Associating User Profiles Maintained by Various Social Networking Systems

Figure 3:
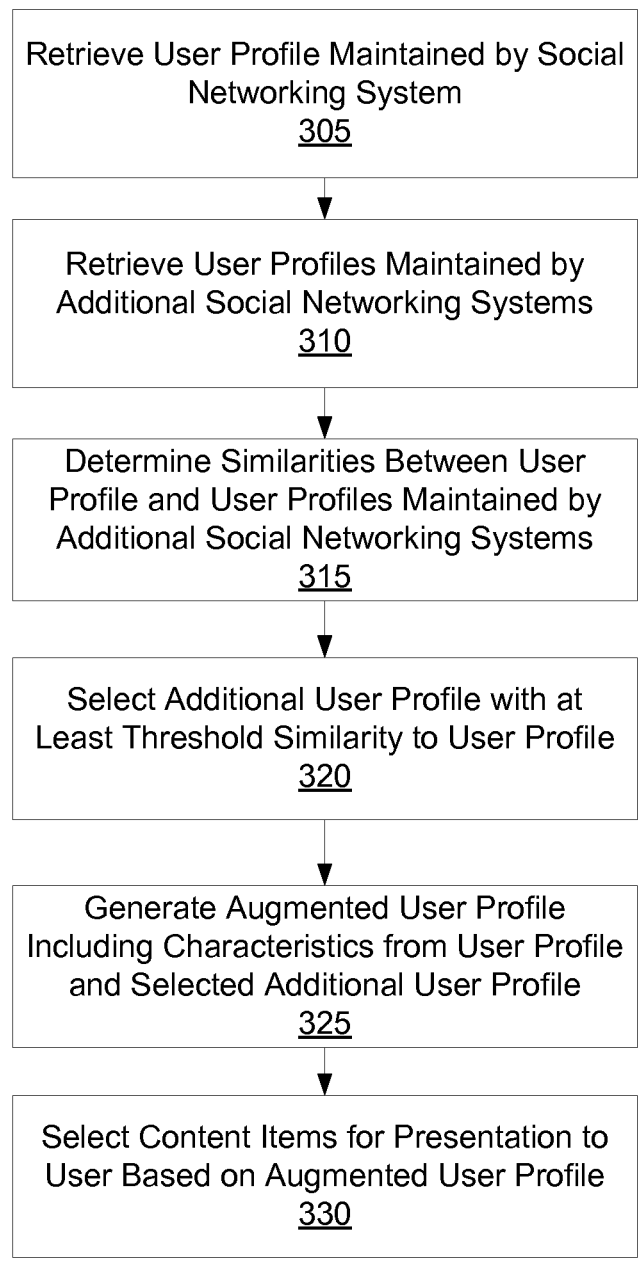
FIG. 3 is a flow chart of a method for selecting content for a social networking system user based on an augmented user profile, in accordance with an embodiment.

FIG. 3 is a flow chart of one embodiment of a method 300 for selecting content for a social networking system user based on an augmented user profile including characteristics of a user included in user profiles maintained by different social networking systems 140A, 140B, 140C. A social networking system 140A retrieves 305 a user profile including characteristics of a user of the social networking system 140A. For example, the user requests that the social networking system 140A create an augmented user profile associated with the user. Alternatively, the social networking system 140A may select a user and retrieve 305 the user profile associated with the user.

The social networking system 140A accesses one or more additional social networking systems 140B, 140C and retrieves 310 additional user profiles maintained by the additional social networking systems 140B, 140C that describe characteristics of users of at least one of the additional social networking systems 140B, 140C. In one embodiment, characteristics included in the user profile are compared to characteristics included in each of the additional user profiles to determine 315 similarities between the user profile and each of the additional user profiles. For example, a similarity between the user profile and an additional user profile provides a measure of the number or percentage of characteristics included in the additional user profile that match at least a portion of a characteristic included in the user profile. In one embodiment, the characteristics from the user profile and from the additional user profile compared to each other to determine 315 a similarity between the user profile and the additional user profile are subject to one or more privacy settings maintained by the corresponding social networking system 140, limiting the compared characteristics to those indicated by a privacy setting as capable of being accessed.

The determined similarity between the user profile and an additional user profile may be based at least in part on a degree with which characteristics in the user profile match characteristics in the additional user profile. For example, a value associated with a characteristic in the user profile matching characteristics in the additional user profile is modified by a weight that is based on whether the characteristic in the user profile partially or fully matches the characteristic in the additional user profile. Hence, a characteristic in the user profile partially matching a characteristic in the additional user profile may contribute less to the similarity between the user profile and the additional user profile than a characteristic in the user profile fully matching a characteristic in the additional user profile.

One or more additional user profiles having at least a threshold similarity to the user profile are selected 320. For example, when determining 315 a similarity between the user profile and an additional user profile, direct characteristics in the user profile are identified and compared to direct characteristics in the additional user profile. As described above in conjunction with FIG. 2, a direct characteristic includes information uniquely identifying a user. Examples of direct characteristics include an e-mail address, a phone number, and a connection between the user profile and the additional user profile. If the user profile and the additional user profile have a matching direct characteristic, the similarity between the user profile and the additional user profile is specified to be a value that equals or exceeds the threshold similarity. As an example, if an open authentication standard is used by a social networking system 140A including the user profile and an additional social networking system 140B including the additional user profile, a user's login credentials are shared by the social networking system 140A and the additional social networking system 140B, so the user profile and the additional user profile are linked to each other. This linking indicates the user profile and the additional user profile are associated with the same user, so the similarity between the user profile and the additional user profile is specified to be at least the threshold value.

However, if at least one direct characteristic included in the user profile does not match a direct characteristic included in the additional user profile, additional types of characteristics in the user profile and in the additional user profile are compared to determine 315 a similarity between the user profile and the additional user profile. In one embodiment, primary characteristics in the additional user profile matching at least a portion of a primary characteristic in the user profile are identified. While a primary characteristic does not uniquely identify a user, it provides information closely associated with a user. Examples of primary characteristics include a proper name, a username, and a profile photograph. Additionally, secondary characteristics in the additional user profile matching at least a portion of a primary characteristic in the user profile are identified. Secondary characteristics provide descriptive information about a user, but are less specific to individual users than primary characteristics. Examples of secondary characteristics include connections between the user profile and other user profiles and media content (e.g., photographs, video data, etc.) associated with the user profile.

Primary characteristics or secondary characteristics included in the user profile at least partially matching primary characteristics or secondary characteristics are identified and used to determine a similarity between the user profile and the additional user profile. For example, a value is associated with matching primary characteristics between the user profile and the additional user profile and an additional, lower, value is associated with matching secondary characteristics between the user profile and the additional user profile and the values combined to generate a score representing the similarity between the user profile and the additional user profile. Thus, whether a matching characteristic is a primary or a secondary characteristic affects the matching characteristic's contribution to the similarity between the user profile and the additional user profile. In one embodiment, the values are modified by a weight that is proportional to the amount of matching; hence, the value of partially matching primary or secondary characteristics is attenuated by a weight when determining the similarity between the user profile and the additional user profile. For example, a weight of 1.0 is associated with fully matching primary characteristics, a weight of 0.5 is associated with partially matching primary characteristic, a weight of 0.6 is associated with matching secondary characteristics, and a weight of 0.25 is associated with partially matching secondary characteristics.

An additional user profile having at least a threshold similarity to the user profile is selected 320 and an augmented user profile including characteristics from the user profile and the selected user profile is generated 325 by the social networking system 140A including the user profile. The augmented user profile is stored by the social networking system 140A and associated with the user profile. In some embodiments, information associated with the selected additional user profile and maintained by the additional social networking system 140B is identified and associated with the augmented user profile. For example, actions associated with the additional user profile and stored by the additional social networking system 140B are identified and associated with the augmented user profile. In one embodiment, actions associated with the additional user profile are analyzed, and information describing the actions associated with the additional user profile (e.g., most frequent actions associated with the additional user profile, actions associated with the additional user profile within a threshold time of a current time, etc.) is associated with the augmented user profile.

Additionally, content associated with the additional user profile and stored by the additional social networking system 140 may be identified, and information describing the content included in the augmented user profile. For example, posts, comments, or other content associated with the additional user profile and maintained by the additional social networking system 140B are analyzed, and subject matter associated with the content is stored in the augmented user profile store generated by the social networking system 140A. For example, text included in various content items associated with the additional user profile is analyzed to determine the subject of the content items or metadata (e.g., tags, location information) associated with content items are analyzed to determine a subject or a location associated with the content. The subject matter and/or location determined from the analysis may be included in the augmented user profile. Similarly, images associated with the additional user profile may be analyzed to identify the subject associated with the image for inclusion in the augmented user profile. In some embodiments, one or more interests are inferred from the analysis of content associated with the additional user profile with the interests stored in the augmented user profile to provide additional information about the user.

In some embodiments, if conflicting characteristics are included in the user profile and the selected additional user profile, both characteristics from the user profile and from the selected additional user profile are included in the augmented user profile. Alternatively, if a characteristic conflicts between the user profile and the selected additional user profile, the characteristic maintained by the social networking system 140 most recently accessed by the user is included in the augmented user profile; alternatively, the characteristic maintained by the social networking system 140 most frequently accessed by the user is included in the augmented user profile. In another embodiment, information associated with the user profile and the additional user profile is compared to characteristics stored by the user profile and/or the additional user profile and a characteristic included in a user profile consistent with information associated with the user profile is included in the augmented user profile. For example, if the user profile indicates that the user resides in San Francisco, Calif. and the additional user profile indicates that the user resides in Miami, Fla., if information associated with the user profile and the additional user profile includes check-in actions proximate to San Francisco, Calif., the residence from the user profile is included in the augmented user profile.

The social networking system 140A selects 325 one or more content items for presentation to the user based at least in part on characteristics from the augmented user profile associated with the user. For example, targeting criteria associated with ad requests are compared to information in the augmented user profile to identify ad requests having one or more targeting criteria satisfied by the user. The identified ad requests may then be ranked based on their bid amounts with one or more advertisements selected based on the ranking of ad requests. Because the augmented user profile includes characteristics of the user from one or more additional social networking systems 140, additional ad requests may be identified than those identified by comparing the ad requests to user characteristics included in the user profile. This increases the number of advertisements eligible for presentation to the user. Additionally characteristics in the augmented user profile may be used to rank content items or to recommend actions for presentation to a user. In one embodiment, the social networking system 140 determines the user's likelihood of interacting with an object maintained by the social networking system 140 by determining the user's affinity for the object based on characteristics or other information in the augmented user profile. For example, interests included in the augmented user profile based on information associated with the additional user profile are compared to objects maintained by the social networking system 140 and used to identify objects with which the user has at least a threshold likelihood of interacting (i.e., objects with which the user has a threshold affinity based on information in the augmented user profile). One or more of the identified objects are presented to the user. In one embodiment, a recommendation to interact with an identified object is presented to the user along with the identified object.

SUMMARY

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Some embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the embodiments, which is set forth in the following claims.

What is claimed is:
1. A method comprising:
retrieving a user profile maintained by a social networking system and associated with a user of the social networking system, the user profile including a plurality of characteristics of the user of the social networking system, the plurality of characteristics including a first primary characteristic and a first secondary characteristic including a media content item that comprises a video or a photograph;

retrieving one or more additional user profiles from one or more additional social networking systems, each additional user profile including respective characteristics of a user of at least one of the additional social networking systems, the characteristics including one or more additional primary characteristics and one or more additional secondary characteristics that include one or more media content items that comprise videos or photographs;

wherein retrieving a user profile maintained by a social networking system and retrieving one or more additional user profiles from one or more additional social networking systems comprises sharing login credentials of the user between the social networking system and the one or more additional social networking systems;

wherein access to the primary and secondary characteristics of the social networking system and the additional social networking systems is limited by user defined privacy settings;

comparing the first primary characteristic and the first secondary characteristic with the one or more additional primary characteristics and the one or more additional secondary characteristics of each additional user profile;

based on the comparison, determining values that describe a degree of match between each of the compared characteristics;

weighting the values, the weight of each respective value based in part on whether the value describes a degree of match between primary characteristics or secondary characteristics, wherein a weight associated with a degree of match between primary characteristics is larger than a weight associated with a degree of match between secondary characteristics;

combining the weight associated with a degree of match between primary characteristics and the weight associated with a degree of match between secondary characteristics;

generating scores for the one or more additional user profiles that describe similarities between the user profile and each of the one or more additional user profiles, and each score is based on the combined weighted values;

determining a similarity between the user profile and each of the one or more additional user profiles based in part on the score;

selecting an additional user profile having a score that equals or exceeds at least a threshold similarity to the user profile;

generating an augmented user profile associated with the user by the social networking system including characteristics included in the user profile and characteristics included in the selected additional user profile;

selecting content for presentation to the user by the social networking system based at least in part characteristics included in the augmented user profile, and wherein selecting content for presentation to the user by the social networking system based at least in part characteristics included in the augmented user profile comprises:

identifying one or more advertisements associated with targeting criteria satisfied by at least one characteristic included in the augmented user profile, ranking the identified one or more advertisements based at least in part on bid amounts associated with each of the identified one or more advertisements, and selecting at least one of the identified one or more advertisements based at least in part on the ranking.

2. The method of claim 1, wherein determining the similarity between the user profile and each of the one or more additional user profiles comprises:

determining whether a direct characteristic included in the user profile matches a direct characteristic included in an additional user profile; and specifying a similarity between the user profile and the additional user profile equaling or exceeding the threshold value if the direct characteristic included in the user profile matches the direct characteristic included in the additional user profile.

3. The method of claim 2, wherein a direct characteristic is selected from a group consisting of: a connection between the user profile and the additional user profile, an e-mail address, a telephone number, and any combination thereof.

4. The method of claim 1, wherein a primary characteristic is selected from a group consisting of: a proper name, a username, a profile photograph, and any combination thereof.

5. The method of claim 1, wherein a secondary characteristic is selected from a group consisting of: connections to one or more user profiles, photographs, video data, and any combination thereof.

6. The method of claim 1, wherein generating the augmented user profile associated with the user by the social networking system including characteristics included in the user profile and characteristics included in the selected additional user profile comprises:

retrieving information associated with the selected additional user profile and maintained by an additional social networking system maintaining the selected additional user profile; and including information describing the retrieved information associated with the selected additional user profile in the augmented user profile.

7. The method of claim 6, wherein the retrieved information associated with the selected additional user profile is selected from a group consisting of: actions associated with the selected additional user profile and maintained by the additional social networking system maintaining the selected additional user profile, content associated with the selected additional user profile and additional social networking system maintaining the selected additional user profile, and any combination thereof.

8. The method of claim 6, wherein the information describing the retrieved information associated with the selected additional user profile comprises one or more subjects associated with the retrieved information associated with the selected additional user profile.

9. The method of claim 1, wherein selecting content for presentation to the user based at least in part on the augmented profile further comprises:

selecting an object maintained by the social networking system with which the user has at least a threshold likelihood of interaction based at least in part on characteristics in the augmented user profile; and identifying the selected object to the user.

10. The method of claim 1, further comprising:

storing the augmented profile associated with the user in the social networking system.

11. A computer program product comprising a non-transitory computer readable storage medium having instructions encoded thereon that, when executed by a processor, cause the processor to:

retrieve a user profile maintained by a social networking system and associated with a user of the social networking system, the user profile including a plurality of characteristics of the user of the social networking system, the plurality of characteristics including a first primary characteristic and a first secondary characteristic including a media content item that comprises a video or a photograph;

retrieve one or more additional user profiles from one or more additional social networking systems, each additional user profile including respective characteristics of a user of at least one of the additional social networking systems, the characteristics including one or more additional primary characteristics and one or more additional secondary characteristics that include one or more media content items that comprise videos or photographs;

wherein retrieve a user profile maintained by a social networking system and retrieving one or more additional user profiles from one or more additional social networking systems comprises sharing login credentials of the user between the social networking system and the one or more additional social networking systems;

wherein access to the primary and secondary characteristics of the social networking system and the additional social networking systems is limited by user defined privacy settings;

compare the first primary characteristic and the first secondary characteristic with the one or more additional primary characteristics and the one or more additional secondary characteristics of each additional user profile;

based on the comparison, determine values that describe a degree of match between each of the compared characteristics;

weight the values, the weight of each respective value based in part on whether the value describes a degree of match between primary characteristics or secondary characteristics, wherein a weight associated with a degree of match between primary characteristics is larger than a weight associated with a degree of match between secondary characteristics;

combine the weight associated with a degree of match between primary characteristics and the weight associated with a degree of match between secondary characteristics;

generate scores for the one or more additional user profiles that describe similarities between the user profile and each of the one or more additional user profiles, and each score is based on the combined weighted values;

determine a similarity between the user profile and each of the one or more additional user profiles based in part on the score;

select an additional user profile having a score that equals or exceeds at least a threshold similarity to the user profile;

generate an augmented user profile associated with the user by the social networking system including characteristics included in the user profile and characteristics included in the selected additional user profile;

select content for presentation to the user by the social networking system based at least in part characteristics included in the augmented user profile, and wherein select content for presentation to the user by the social networking system based at least in part characteristics included in the augmented user profile comprises:
- identify one or more advertisements associated with targeting criteria satisfied by at least one characteristic included in the augmented user profile,
- rank the identified one or more advertisements based at least in part on bid amounts associated with each of the identified one or more advertisements, and
- select at least one of the identified one or more advertisements based at least in part on the ranking.

12. The computer program product of claim 11, wherein select content for presentation to the user based at least in part on the augmented profile further comprises:
- select an object maintained by the social networking system with which the user has at least a threshold likelihood of interaction based at least in part on characteristics in the augmented user profile; and
- identify the selected object to the user.

13. The computer program product of claim 11, wherein determine the similarity between the user profile and each of the one or more additional user profiles comprises:
- determine whether a direct characteristic included in the user profile matches a direct characteristic included in an additional user profile; and
- specify a similarity between the user profile and the additional user profile equaling or exceeding the threshold value if the direct characteristic included in the user profile matches the direct characteristic included in the additional user profile.

14. The computer program product of claim 13, wherein the direct characteristic is selected from a group consisting of: a connection between the user profile and the additional user profile, an e-mail address, a telephone number, and any combination thereof.

15. The computer program product of claim 11, wherein determine the similarity between the user profile and each of the one or more additional user profiles comprises:
- determine a similarity between the user profile and an additional user profile based at least in part on one or more primary characteristics included in the additional user profile matching at least a portion of one or more primary characteristics included in the user profile.

16. The computer program product of claim 15, wherein a primary characteristic is selected from a group consisting of: a proper name, a username, a profile photograph, and any combination thereof.

17. The computer program product of claim 15, wherein the similarity between the user profile and the additional user profile is further based at least in part on one or more secondary characteristics in the user profile matching at least a portion of one or more secondary characteristics included in the additional user profile.

18. The computer program product of claim 17, wherein a secondary characteristic is selected from a group consisting of: connections to one or more user profiles, photographs, video data, and any combination thereof.

* * * * *